March 13, 1928.

R. H. PRATT 1,662,164

VARIABLE SPEED TRANSMISSION

Filed July 26, 1926

INVENTOR:
ROSS H. PRATT.
By Ralph S. Turoff
ATTORNEY.

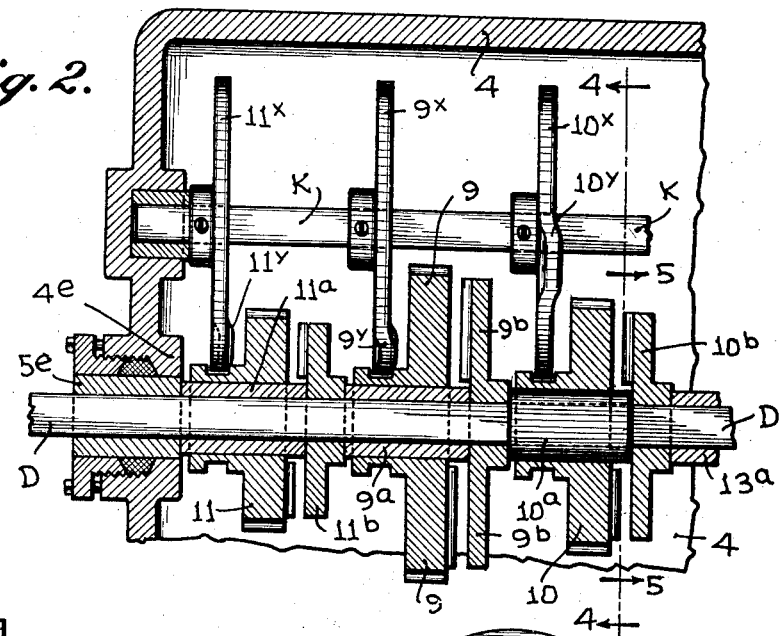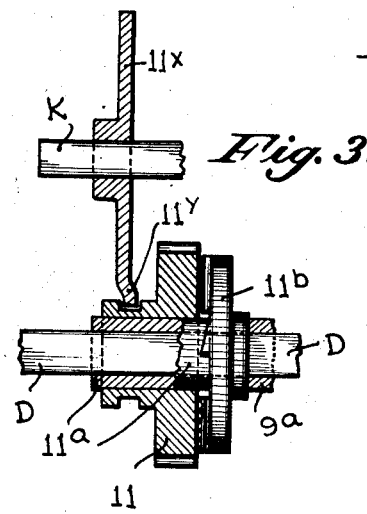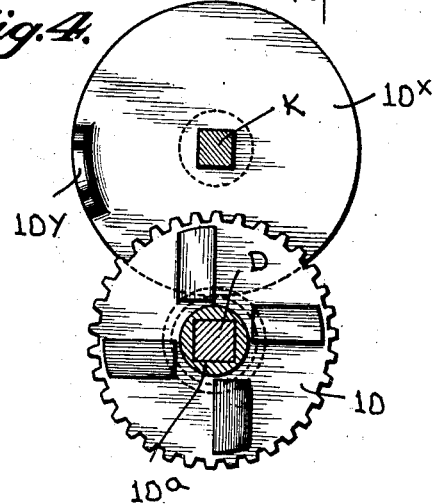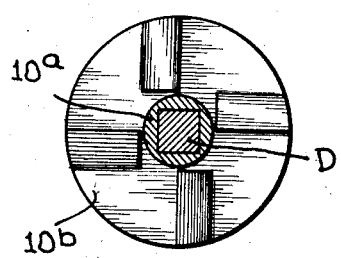

March 13, 1928.
R. H. PRATT
1,662,164
VARIABLE SPEED TRANSMISSION
Filed July 26, 1926     4 Sheets-Sheet 3
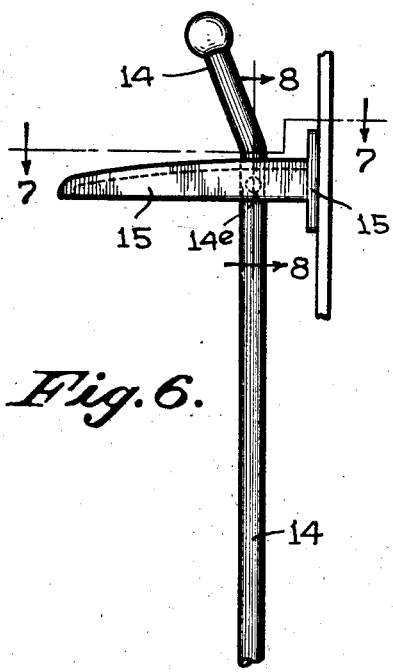
*Fig. 6.*
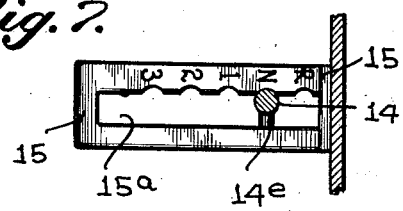
*Fig. 7.*
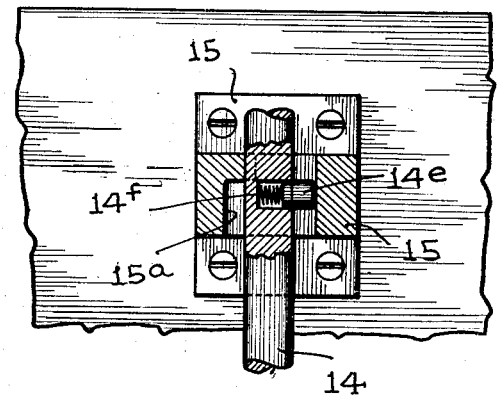
*Fig. 8.*
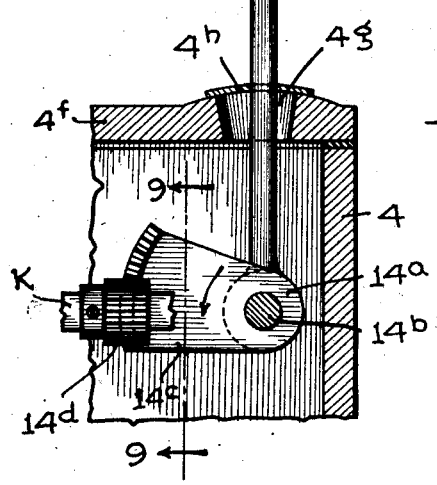
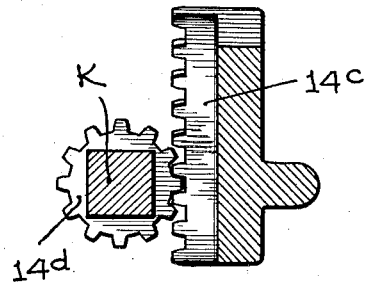
*Fig. 9.*
INVENTOR:
ROSS H. PRATT.
By Ralph S. Turff
ATTORNEY.

March 13, 1928.

R. H. PRATT 1,662,164

VARIABLE SPEED TRANSMISSION

Filed July 26, 1926

INVENTOR:
ROSS H. PRATT.
BY Ralph S. Turff
ATTORNEY.

Patented Mar. 13, 1928.

1,662,164

UNITED STATES PATENT OFFICE.

ROSS H. PRATT, OF WASHINGTON, DISTRICT OF COLUMBIA.

VARIABLE-SPEED TRANSMISSION.

Application filed July 26, 1926. Serial No. 124,895.

This invention relates to variable speed transmissions and more particularly to variable speed gearing especially designed for use in connection with the transmissions of motor vehicles.

It is a major purpose of the present invention to provide a transmission wherein variation of speed is had through operatively engaging gears of varying speed ratios by means of specially controlled clutches, the teeth of the gears being constantly engaged or in mesh.

It is a further object of the present invention to provide an improved transmission wherein acceleration or deceleration of speed may be conveniently had, and wherein, if desired, the change may be readily made from a high to a lower gear for the purpose of utilizing the engine as a braking power when descending grades. It is a still further purpose of the present invention to provide an improved transmission wherein a change to a slow speed is made easy when traffic conditions require the same, without cutting off the fuel supply or otherwise reducing the pulling power of the engine or overburdening the engine by excessive application of brakes, the lower speed or gear giving the engine greater leverage and eliminating the danger of stalling on railway or street car tracks or other dangerous places when driving slowly.

In the general type of so called "sliding gear transmissions", wherein a gear must be brought from a position at rest into engagement with another gear through a sliding movement, it is difficult and often impossible to effect such engagement when the speed of rotation of the propeller shaft is greater than the speed of rotation of the crank shaft, which is generally the condition when the vehicle is descending a grade. Accordingly with the aforesaid sliding gear type of transmission it becomes dangerous and in most instances impossible to attempt such a shifting of gears to utilize the braking power of the engine at a lower speed. In the present invention, with all of the gears constantly in mesh, any desired change or variation from a high gear to a lower gear or vice versa may be conveniently had.

It is a still further object of the present invention to provide in a transmission of the type set forth, means for automatically shifting the usual clutch between the engine and drive shafts when a change in gearing is desired, without the necessity of operating the usual clutch pedal.

It is a still further object of the present invention to provide mechanism including a lever, whereby the various changes in gearing may be had in proper sequence by a continuous movement of such lever in one direction.

Transmissions have heretofore been designed having all gears constantly in mesh, engagement being had between desired gears for varying speeds by means of slidable keys engaging the hubs of the gears or by equivalent means. These transmissions as a class have failed of being successful first because of the stress applied to the keys and second because of the difficulty of properly shifting the keys under the varying conditions of relative speed between the vehicle and the engine. The present invention is designed to operate through proper mechanism, clutches which form an integral part of each driven gear, the operative mechanism being so designed as to simultaneously disengage the engine clutch coincident with the transition from one speed to another. Further objects of the present invention will be hereinafter more fully set forth.

The accompanying drawings illustrate one practical transmission embodying the invention which will be described in detail to enable others to understand and use the same, but the invention is not considered restricted to the specific construction shown in the drawings, and reference is therefore had to the claims for summaries of the essentials of the invention and of the novel features of construction and of the novel combinations of parts for all of which protection is desired.

As shown in the drawings:

Figure 2 is a detail view illustrating several of the gears, clutches, and operative cams, parts being shown in section.

Figure 3 is a detail sectional view through one of the gears, its associated clutch and operative cam therefor, illustrating the cam in engaged position.

Figure 4 is a detail sectional view taken on the line 4—4 of Figure 2.

Figure 5 is a detail sectional view taken on the line 5—5 of Figure 2.

Figure 1:
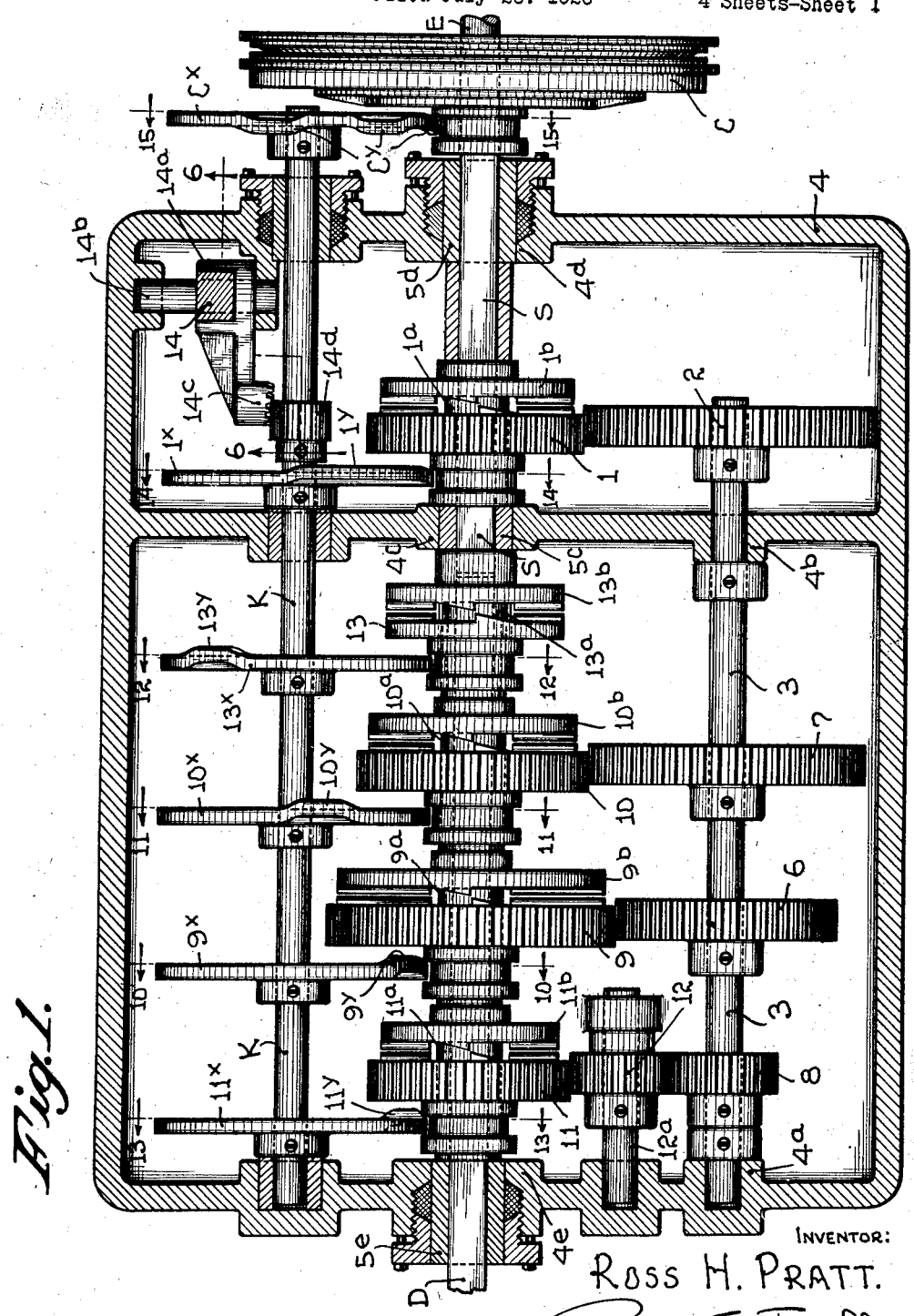
Figure 1 is a top plan view of the entire transmission, parts being broken away.

Figure 6 is a detail sectional view taken on the line 6—6 of Figure 1, illustrating the gear shifting lever and guide therefor.

Figure 7 is a detail sectional view taken on the line 7—7 of Figure 6, illustrating the gear shifting lever guide bracket.

Figure 8 is a detail sectional view taken on the line 8—8 of Figure 6.

Figure 9 is an enlarged detail sectional view taken on the line 9—9 of Figure 6.

Figure 10:
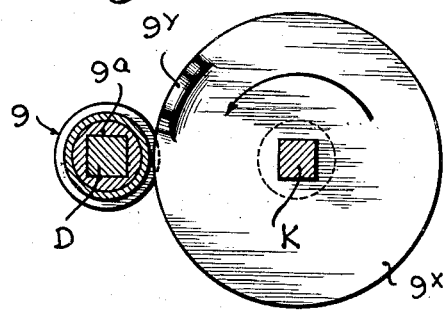

Figure 10 is a detail sectional view taken on the line 10—10 of Figure 1, illustrating the cam for shifting or controlling first or low gear.

Figure 11:
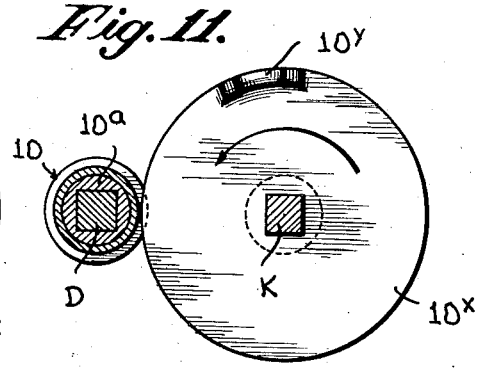

Figure 11 is a detail sectional view taken on the line 11—11 of Figure 1, illustrating the cam for controlling second or intermediate gear.

Figure 12:
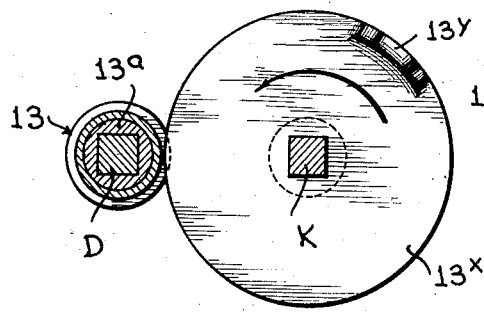

Figure 12 is a detail sectional view taken on the line 12—12 of Figure 1, illustrating the cam for controlling third or high gear.

Figure 13:
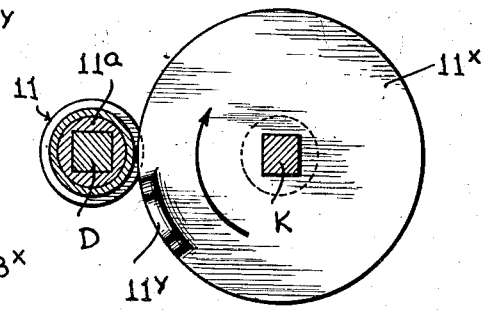

Figure 13 is a detail sectional view taken on the line 13—13 of Figure 1, illustrating the cam for controlling reverse gear.

Figure 14:
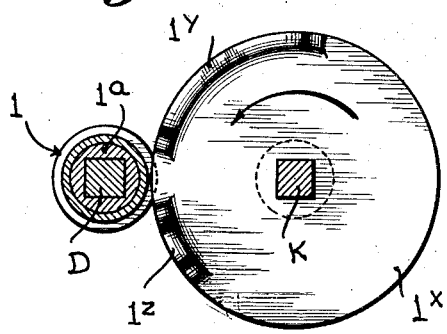

Figure 14 is a detail sectional view taken on the line 14—14 of Figure 1, illustrating the cam for controlling the rotation of the driven shaft, by the drive shaft through a counter shaft, for all speeds including reverse except high.

Figure 15:
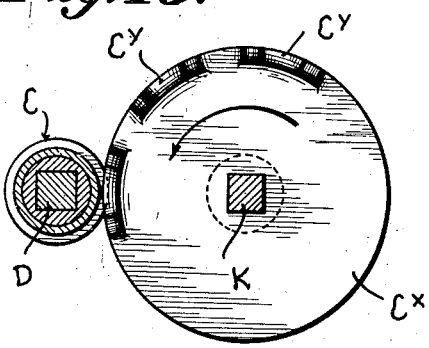

Figure 15 is a detail sectional view taken on the line 15—15 of Figure 1, illustrating the cam for controlling the automatic shifting or operation of the engine clutch, between the engine and the drive shafts.

As shown in the drawings and as is usual in motor vehicle transmissions, the engine shaft E is operatively connected with the drive shaft S through the medium of the usual type of cone of disc clutch C. The shaft S is preferably square in cross section for a purpose to be hereinafter more fully described, and has properly positioned thereon a sleeve $1^a$ upon which is slidably mounted for free rotation a gear 1 adapted to mesh with a gear 2 rigidly secured upon a counter shaft 3 journaled in suitable bearings $4^a$ and $4^b$ in the transmission housing 4. To provide for free rotation of the drive shaft, sleeves or rings $5^c$ and $5^d$ are mounted thereon adapted to roate within bearings $4^c$ and $4^d$ in the transmission housing.

Keyed or otherwise rigidly secured to the counter shaft 3 are a plurality of pinions or gears 6, 7 and 8; the gears 6 and 7 meshing directly with gears 9 and 10 upon a driven shaft D, while the gear 8 meshes with a gear 11 also mounted upon the driven shaft through an intermediate gear 12 mounted upon a stub shaft $12^a$ properly positioned in suitable bearings within the transmission housing. The gears 9, 10 and 11 respectively control low, intermediate and reverse speeds of the transmission, and are slidably mounted for free rotation upon sleeves $9^a$ $10^a$ and $11^a$ respectively, the sleves being properly positioned upon the driven shaft D. The shaft D is preferably square in cross section and of a diameter equal to that of the drive shaft S. To provide for free rotation of the driven shaft D, a sleeve $5^e$, journaled in a bearing $4^e$ in the transmission housing, is mounted thereon.

It will thus be seen that the driven shaft D is operatively connected and driven by the drive shaft S through the gears 1 and 2 for low, intermediate and reverse speeds. It is customary in motor vehicle transmissions in general use, that the running or high speed of the transmission be a direct drive from the engine shaft, and to this end a slidable clutch 13, of any desired type, is splined or otherwise slidably secured upon a sleeve $13^a$ positioned upon the driven shaft D adjacent the extremity thereof, the shafts D and S terminating within the hub of the complemental stationary portion $13^b$ of the clutch. The gear 1 is provided with a similar clutch $1^b$ which is disengaged when it is desired that the high speed or direct drive be used. It will be readily understood that when such clutch is disengaged and the high gear or direct drive is being used, all of the gears will be in mesh and will be at rest, the said gears in no way interfering with the direct driving of the driven shaft D by the drive shaft S, inasmuch as the said shafts are free to rotate through the medium of the sleeves upon which the said gears are mounted.

The gears 9, 10, 11 and 1, it will be noted are positioned in slightly offset relationship to the gears with which they mesh so that they may be moved in a right hand direction (see Figure 1) into engaging position and will more fully mesh with their companion gears, this offset relationship, it will be noted however, is not sufficient to interfere with the proper meshing or engaging of all gears at all times.

The inner face of the gear 1 is provided with a plurality of clutch teeth adapted to engage with oppositely directed teeth upon a stationary clutch member $1^b$ rigidly secured upon the drive shaft S in spaced relationship to the gear 1; the said gear thus becoming the movable half of a slidably operated clutch. In like manner the inner faces of the gears 9, 10 and 11 and of the clutch 13 are each provided with a plurality of clutch teeth adapted to engage with oppositely directed clutch teeth upon stationary clutch members $9^b$, $10^b$, $11^b$, and $13^b$ respectively.

It will thus be seen that with the gear 1 in the position as illustrated in Figure 1, the clutch $1^b$ is disengaged and upon the rotation of the drive shaft S the sleeve $1^a$ will turn freely within the gear 1 and no motion will be imparted to the counter-shaft 3. Movement of the gear 1 in a right hand direction will result in the teeth thereon engaging with the teeth on the clutch $1^b$, which, being rigidly secured to the shaft S rotates therewith, and such engagement will result in the rotation of the gear 1 and through the gear 2 the rotation of the countershaft, and through the gears 6, 7 and 8, the rotation of the gears 9, 10 and 11 will result. It will be clearly understood that engagement of the proper clutch $9^b$, $10^b$ or $11^b$ will then result in the operating or driving of the driven shaft at low speed or gear, intermediate gear or reverse gear respectively. If it is desired to drive directly at high speed or gear, disengagement of the clutch $1^b$ will permit all of the gears to come to rest their clutches having also been disengaged, while engagement of the clutch $13^b$ will, as above described, permit of a direct drive of the shaft D through the shaft S. It will be understood that any desired form of clutch may be used, that shown being illustrative rather than limitive. It will be further understood that while the transmission has been illustrated and described as including three speeds forward and one speed in reverse, by increasing the number of gears upon the countershaft and upon the driven shaft, and in like manner increasing the operative control mechanism, the number of variations of speed either forward or backward may be increased at will. While the shafts D and S have been described as being preferably square in cross section and the gears and clutch as being slidably mounted for free rotation upon sleeves properly positioned upon the said shafts, shafts of any desired cross-sectional shape might be as conveniently used and any desired means be employed to permit of the free rotation and slidable movement of the said gears or clutches upon the said shafts.

Suitable mechanism is provided to insure the proper engagement of the desired clutch at the desired time, and to insure the disengagement of all clutches except the ones governing the desired speed. This mechanism, in the preferred embodiment of the present invention, comprises a cam shaft K upon which are rigidly secured a series of cams $9^x$, $10^x$, $13^x$, $11^x$, $1^x$ and $C^x$. These cams are preferably disc-like and are provided with offset portions properly positioned along the peripheries thereof; the cams being so positioned along the cam shaft K that their peripheries will engage between shoulders formed upon the hubs of the gears 9 and 10, the clutch 13, the gears 11 and 1, and the clutch C. In the neutral position of the transmission as illustrated in Figure 1, each of these cams presents a non-offset portion to its respective gear or clutch, thus securely retaining the slidable portion of each clutch in extreme left or disengaged position. It will be noted that the offset portions of the cams $9^x$, $10^x$, $13^x$, $11^x$, and $1^x$ project in a direction to the right (see Figure 1), with the result that rotation of the cam shaft to produce engagement between the offset portion of any cam and its associated clutch member will move such slidable clutch member in a direction to the right, with the resultant positive engagement of the particular clutch.

Any desired means may be provided for the proper rotation of the cam shaft K. Preferably such means comprises a gear shift lever 14 having a hub portion $14^a$ rigidly secured to a stub shaft $14^b$ journaled within suitable bearings in the transmission housing. Secured to the stub shaft $14^b$, or as disclosed in the drawings, forming an integral part of the hub $14^a$, is a toothed segment $14^c$ adapted to engage with a pinion $14^d$ rigidly secured to the cam shaft K. Movement of the lever 14 in either direction will result in the rotation of the stub shaft $14^b$ and through the segment $14^c$ and the pinion $14^d$ rotation of the cam shaft will result. The lever 14 projects upward through a suitable slot $4^g$ in the cover $4^f$ of the transmission housing; a cover $4^h$, or any other suitable means being provided for the exclusion of dust or foreign matter.

Mounted upon any suitable place as the dash or instrument board of the vehicle is a bracket or guide 15 provided with a slot $15^a$ in which the lever 14 is guided. This slot may be provided along one side thereof, with a plurality of cut-away portions or notches properly marked, as indicated in Figure 7 of the drawings, with the indicia "R, N, 1, 2 and 3" for the reverse, neutral, first or low, second or intermediate, and third or high speeds respectively. With the lever 14 in the neutral position the rotation of the driven shaft D may be accelerated through all of its speeds from low to high by a movement of the lever in one direction from said position, while movement of the lever in the reverse direction will result in the engagement of the reverse speed. Any desired means may be provided to insure the proper seating of the lever in any desired notch in the guide bracket 15. Preferably the lever is recessed on its side opposite the notches in the guide bracket and is adapted to receive a pin $14^e$ held in engagement with the adjacent side of the slot $15^a$ by the spring $14^f$ seated within the recess. A slight pressure against the lever will be sufficient to disengage the same and will permit of the shifting thereof to any desired notch in the guide bracket, while the tension of the coil spring $14^f$ is sufficient to insure the lever remaining in any desired notch until manually removed therefrom.

A movement of the lever from the neutral position or notch "N" to the low speed position or notch "1", will result in the partial rotation of the stub shaft $14^b$ in the direction of the arrow, see Figure 6, and through the segment 14ᶜ and pinion 14ᵈ the cam shaft K will be rotated sufficiently to engage the offset portion 9ʸ of the cam 9ˣ with the hub of the gear 9, thus engaging the clutch 9ᵇ. At the same time the offset portion 1ʸ of the cam 1ˣ will be brought into engagement with the hub of the gear 1 thus engaging the clutch 1ᵇ. It will be readily seen that the shaft D will thus be driven at low speed from the drive shaft S through the gears 1 and 2 and the gears 6 and 9. If it is desired to increase the speed of rotation of the driven shaft D from low to second speed, a movement of the lever from the notch "1" to the notch "2" will result in a further rotation of the camshaft, with the resultant disengagement of the clutch 9ᵇ and the engagement of the offset portion 10ʸ of the cam 10ˣ with the hub of the gear 10, thus engaging the clutch 10ᵇ; the offset portion 1ʸ on the cam 1ˣ being of sufficient length to maintain the engagement of the clutch 1ᵇ for both low and intermediate speeds. Movement of the lever from the notch "2" to the notch "3" for high speed will result in like manner in the disengagement of the clutch 10ᵇ, the camshaft K being further rotated until the offset portion 13ʸ of the cam 13ˣ is brought into engagement with the hub of the clutch member 13, thereby engaging the clutch 13ᵇ. At the same time the cam 1ˣ will have been rotated so as to bring the straight portion thereof into engagement with the hub of the gear 1 with the resultant disengagement of the clutch 1ᵇ. This, as above described, permits of the free rotation of the shaft S within the gear 1, and results in the direct drive of the shaft D from the shaft S, all of the gear coming to rest. With the lever 14 at the neutral position, a movement thereof from the notch "N" to the notch "R" will result in a reverse rotation of the cam shaft in the direction of the arrow, see Figure 13, bringing the offset portion 11ʸ of the cam 11ˣ into engagement with the hub portion of the gear 11, thus engaging the clutch 11ᵇ. At the same time the offset portion 1ᶻ of the cam 1ˣ will be brought into engagement with the hub of the gear 1, thus again engaging the clutch 1ᵇ. The shaft D will thus be driven at reverse speed from the shaft S through the gears 1 and 2 and the gears 8, 12, and 11. With the transmission in low, intermediate or reverse speeds, the clutch 1ᵇ will be in engagement as well as either of the clutches 9ᵇ, 10ᵇ or 11ᵇ in accordance with the speed or gearing desired. With the engine in high speed all of these clutches will be disengaged, only the high speed clutch 13ᵇ being in operative engagement.

To insure the proper automatic operation of the engine clutch C, the cam Cˣ is provided with a plurality of offset portions Cʸ reversely directed with respect to the offset portions on the other cams. These offset portions Cʸ are located or positioned in staggered relationship to the positioning of the offset portions of the cams for controlling the various speeds. It will thus be clearly understood from an examination of Figure 15 of the drawings, that during the period of shifting from any speed to another, one of these offset portions Cʸ will be brought into engagement with the hub of the clutch C with the resultant disengagement of the said clutch during the shifting period. Accordingly the engine clutch will be automatically and gradually shifted or properly "let in and out" with the variation of the gear or speed of rotation of the driven shaft, thereby obviating the possibility of an attempt to shift gears without the engine clutch being properly operated or disengaged and without the necessity of any operation other than the shifting of the gear shift or control lever. All of the offset portions on all of the cams are provided with gradually sloping sides thereby assuring the gradual engagement or disengagement of any particular clutch as desired.

It will be noted that the shafts S and D are preferably square in cross section and that the various gears are mounted on sleeves positioned on the said shafts, while the stationary portions of the clutches are mounted directly upon the square shafts. The lengths of the sleeves are such as to permit them to positively contact with each side of such stationary clutch members, thus retaining said members immovably positioned upon the shafts upon which they are mounted. There is thus provided a novel extremely economical and convenient method of mounting all of the gears and clutches without the use of keys, screws, etc., permitting of the free rotation upon the sleeves of the slidable half of each clutch and at the same time insuring the rigidity with which the stationary portions of such clutches are mounted. While the shafts D and S have been illustrated and described as being preferably square in cross section for the reasons above set forth, it will be obvious that round or other types of shafts might be employed with the various parts properly mounted thereon.

There has thus been described a transmission wherein all of the gears are constantly in mesh; wherein shifting of gears may be readily accomplished without possibility of "stripping" of the gears and without the difficulty or necessity of considering the relative speed of the vehicle with respect to the speed of rotation of the engine shaft; wherein the shifting or variation from a high to a lower gear may be as readily and conveniently made—thus utilizing the increased braking power of the engine at the lower speed when descending grades—as from a low to a higher gear; and wherein change of gearing is had by a continuous movement of the "gear shift" or control lever in a single direction.

The invention having thus been described, what is claimed is:—

1. In a variable speed transmission including driving mechanism and a driven shaft carrying a plurality of clutch controlled transmission gears, a cam shaft carrying a disk-like cam adapted to directly engage with one of said clutches and actuate said clutch to engage the transmission gear with the driving mechanism and means for operating said cam.

2. A variable speed transmission comprising a clutch controlled drive shaft, a driven shaft, a clutch between said drive and driven shafts, a plurality of clutch controlled transmission gears slidably mounted for free rotation on the driven shaft the said gears forming the slidable portions of such clutches, a counter shaft carrying a series of gears meshing with the said transmission gears and a clutch controlled operative connection between the said drive and counter shafts, a cam shaft carrying a series of circular cams adapted to directly engage between shoulders formed on the slidable portions of the clutch mechanism and operable to cause driving engagement of the transmission gears with the driven shaft, and means for progressively operating said cams, said means comprising a lever pivotally mounted within the transmission housing carrying a toothed segment, a pinion secured to the cam shaft meshing with the said toothed segment whereby the cam shaft may be progressively rotated to operatively engage the cams with the clutch mechanism.

In testimony whereof he affixes his signature.

ROSS H. PRATT.